3,466,055
VEHICLE LEVELING SYSTEM
Johan H. Keijzer, Brustem, Belgium, assignor to Monroe Belgium N.V., St. Truiden, Belgium, a corporation of Belgium
Filed Mar. 22, 1967, Ser. No. 625,146
Int. Cl. B62d 37/00, 37/02
U.S. Cl. 280—6                                23 Claims

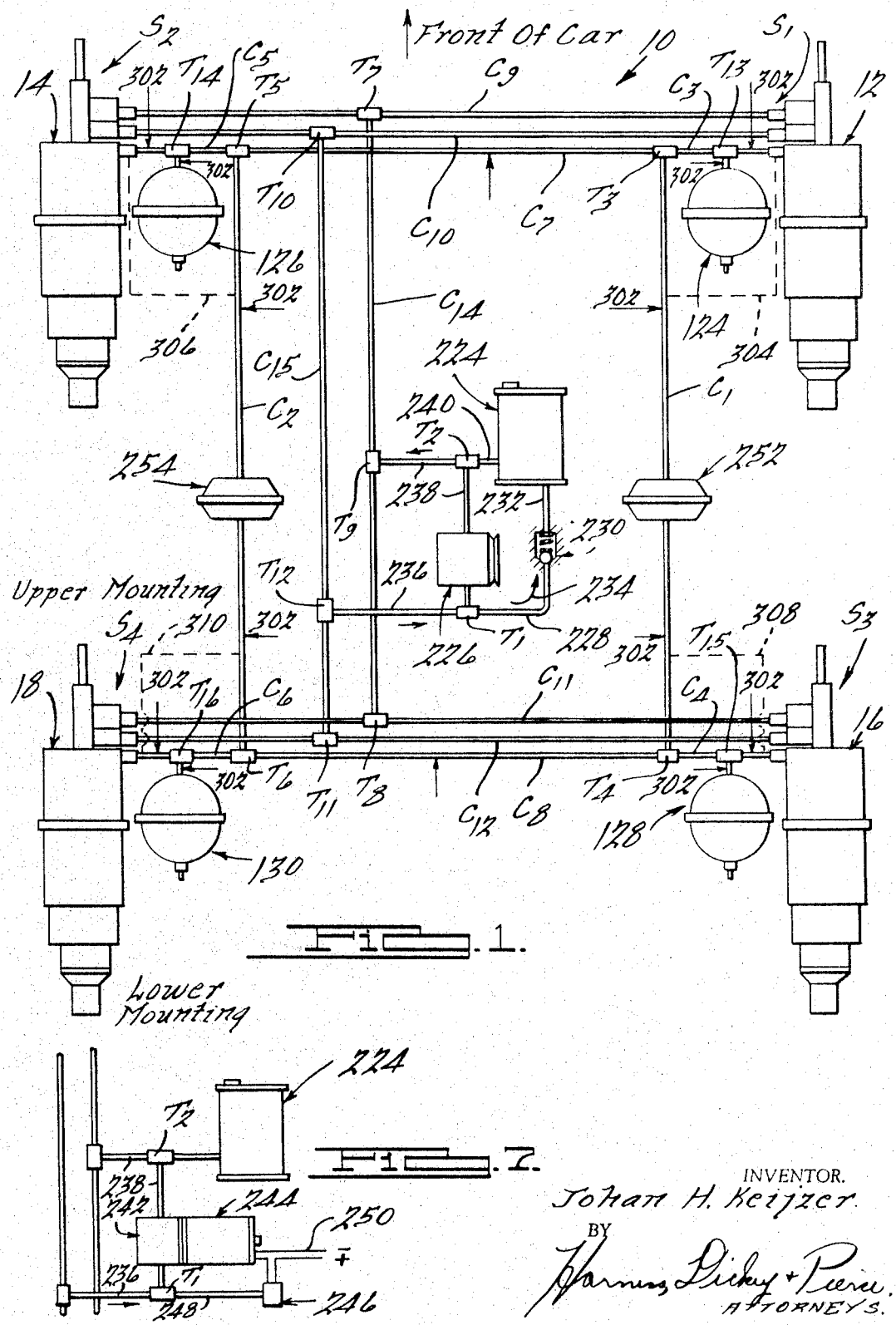

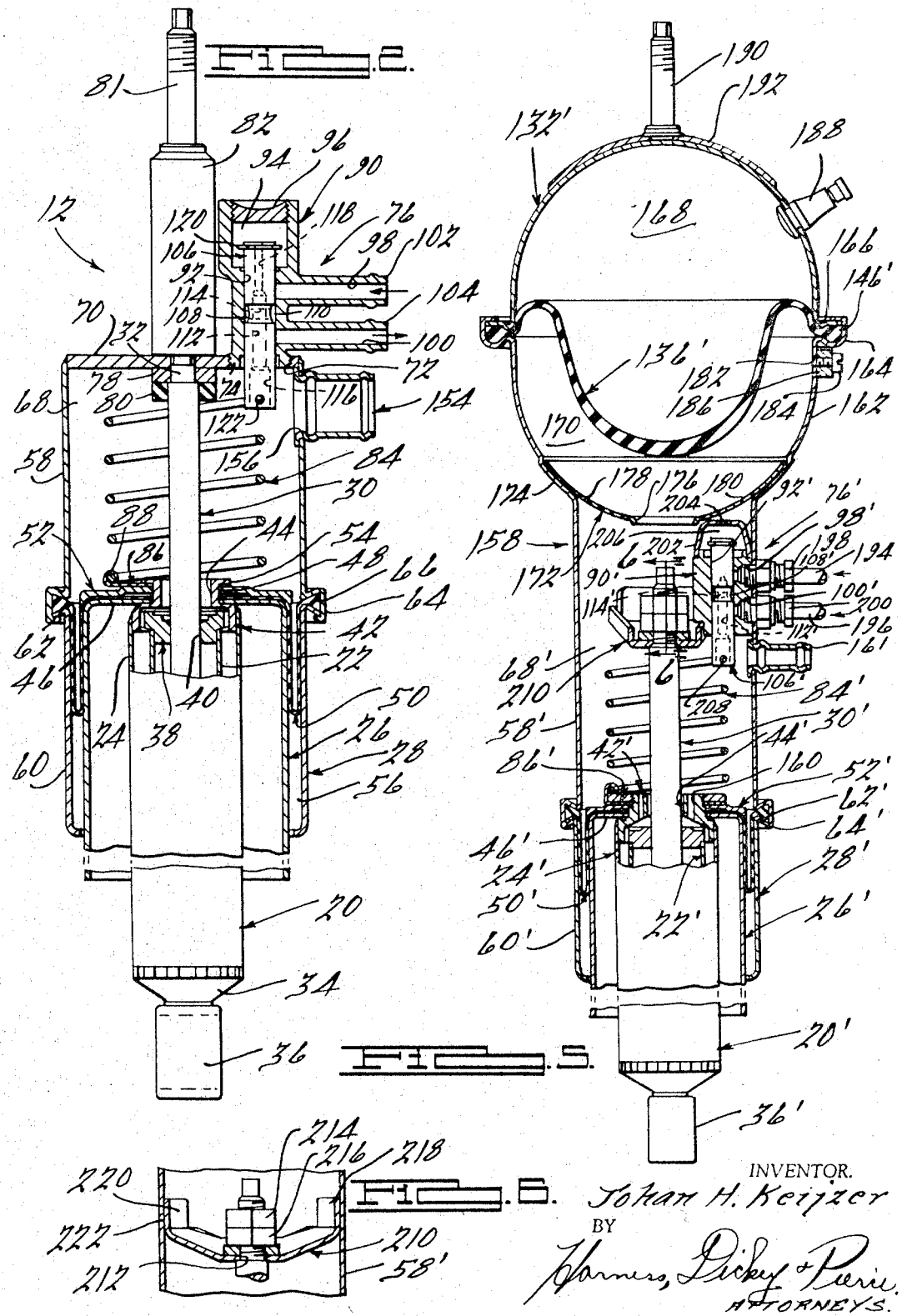

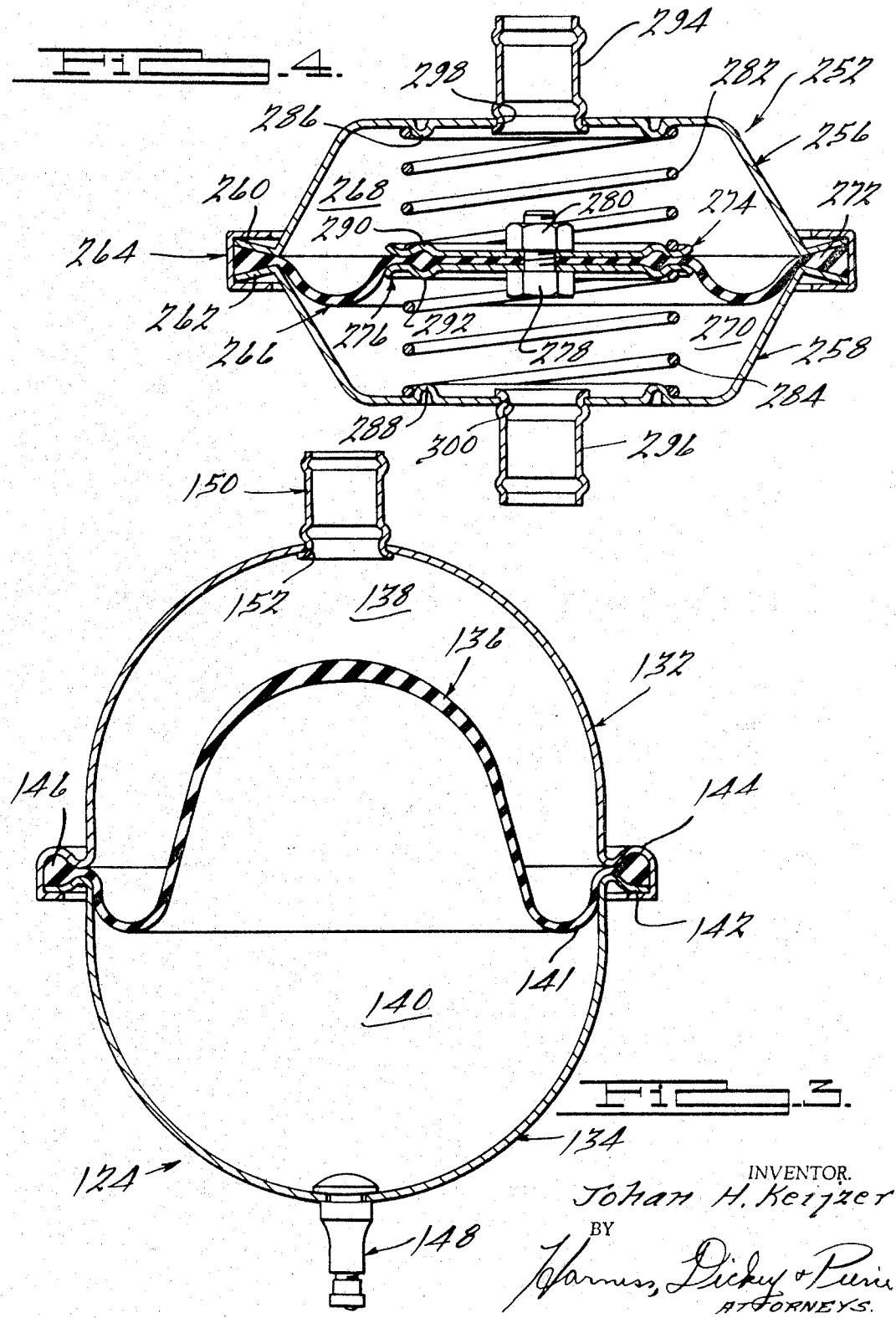

ABSTRACT OF THE DISCLOSURE

A leveling system comprising a plurality of vehicle suspension units interposed between the sprung and unsprung portions of an automotive vehicle and adapted to control the relative attitude between said vehicle portions; a combination fluid-air spring unit and a fluid leveling valve device operatively associated with each of the suspension units for controlling selective actuation thereof; fluid circuit means communicating the suspension units at the front and/or rear end of the vehicle and the units along the same side of the vehicle; a fluid reservoir and pumping means for transmitting actuating fluid to the suspension units, and load compensating means interposed between the suspension units on the same side of the vehicle for controlling the actuation of the suspension units at the front and rear of the vehicle in response to unequal load distribution.

---

The purpose of the above abstract is to provide an non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

Generally speaking, there are three different types of suspension systems currently being used on automotive vehicles. The first type, and that which is in widest use, is the conventional suspension system comprising some type of spring mechanism such as leaf springs, coil springs, torsion bars, and some types of springs fabricated of rubber or some other resilient composition. By and large, such spring suspension systems are not provided with any type of leveling devices for selectively controlling the attitude between the sprung and unsprung portions of the vehicles, nor are such systems provided with any means interconnecting the forward and rear spring means to control the attitude of the vehicle body under different loading conditions.

The second type of suspension system which has been used on automotive vehicles is generally categorized as an air suspension system. Such systems incorporate various types of air cylinders which are interposed between the sprung and unsprung portions of vehicles and are adapted to be selectively inflated and deflated in accordance with various existing loading conditions. By their very nature, such air systems require relatively expensive air compressing devices and have been objectionable due to the fact that a large quantity of air has had to be displaced in order to accommodate different loading conditions. Moreover, such systems have been undesirable in that the atmospheric air pumped into the systems has almost always been contaminated with foreign material including at least a certain amount of moisture or condensation which, under different ambient temperature conditions, has tended to accumulate in the system, resulting in freezing of the air valves and the like, and requiring periodic draining.

The third type of suspension system which has heretofore been known and used is the hydraulic system which utilizes a plurality of hydraulically actuated and piston and cylinder devices for varying the attitude of a vehicle body relative to the unsprung portion thereof. Although such hydraulic suspension units have been highly desirable from the standpoint that considerably less hydraulic fluid is required than air is needed in comparable air suspension units, such hydraulic suspension systems have remained undesirable due to the relatively high hydraulic pressures, i.e., approximately 2,000 p.s.i., exerted against the various pumps, hydraulic conduits and suspension units. As a result of these high pressures, such hydraulic suspension systems have required relatively complicated valving, pumps, and have encountered frequent sealing problems, resulting in expensive maintenance due to excessive wear and frequent loss of hydraulic pressure.

It is generally agreed between experts in the vehicle suspension arts that an ideal suspension system for an automotive vehicle is characterized by a relatively low spring rate and a constant vehicle body height under different loading conditions. This, of course, provides for a uniform, comfortable ride, without detracting from the esthetic appearance of the vehicle. Some suspension systems heretofore known have utilized relatively large auxiliary units on the rear ends of the vehicle units to provide for comfortable riding conditions under heavy loading conditions, but the appearance of such vehicles was adversely affected due to the fact that the rear ends of the vehicle bodies would frequently be disposed substantially above the rear axles under low load conditions.

In order to achieve a vehicle leveling system which is as nearly ideal as is economically feasible, the present invention generally contemplates the use of the following features. First, the leveling system of the present invention incorporates the use of a gas, preferably air, as a spring element in order to provide for a progressive spring rate, flexibility and adaptability of design, and relatively low costs. Next, the present invention incorporates hydraulic fluid, preferably oil of a suitable viscosity, as a leveling element, since the volume of such a fluid required to level a vehicle body is substantially less than the volume of a compressible gas required to accomplish a comparable leveling job. Moreover, pumping means for transmitting such a fluid to the various suspension units are considerably cheaper than air or gas compressor means heretofore utilized in air suspension systems. The leveling system of the present invention next contemplates the use of a direct acting suspension unit, i.e., acting directly against the sprung portion of the vehicle, by virtue of the fact that this design results in lighter and more economical mounting structures, easier installation, and lower internal fluid pressures. The present invention also contemplates the use of a relatively low pressure system which enables the use of substantially simple stampings instead of forgings and machined parts, thereby reducing and in some cases obviating any machining operations and considerably simplifying assembly of the system. Furthermore, such a low pressure system enables the use of membranes or diaphragms instead of relatively expensive fluid seals, whereby to eliminate static friction and also minimize expenses in assembly of the system. Finally, the present invention contemplates the use of a shock absorber system in combination with associated spring elements, which results in reduced loading on either of the two suspension components and a corresponding reduction of any excessive structural forces (couples) on the suspension arms.

SUMMARY OF THE INVENTION

This invention relates generally to a new and improved leveling system adapted to automatically maintain the body portion of a vehicle in a substantially level attitude regardless of the loading conditions imposed thereon or the particular road conditions over which the vehicle is traveling. More particular, the present invention relates to a vehicle leveling system of the above character incorporating a closed hydraulic system communicating hydraulic fluid to each of a plurality of suspension assemblies operatively disposed at either or both the ends of the vehicle for controlling the relative attitude between the sprung and unsprung portions of the vehicle and adapted to provide for improved riding conditions by maintaining a minimum spring rate.

With the foregoing in mind, it is a general object of the present invention to provide a new and improved vehicle leveling system adapted to overcome the previously mentioned problems associated with heretofore known and used vehicle leveling systems.

It is a more particular object of the present invention to provide a new and improved leveling system which provides for a more comfortable ride by maintaining a relatively low spring rate, while automatically keeping the vehicle body at a predetermined riding height.

It is another object of the present invention to provide a new and improved leveling system of the above character which does not require any separate mechanical connections between the vehicle axle and the leveling valve means of the system which might be subject to maladjustment and wear.

It is another object of the present invention to provide a new and improved leveling system of the above character which incorporates a closed hydraulic system, thereby obviating the need for any expensive fluid seals and the attendant possibility of fluid leakage.

It is still another object of the present invention to provide a new and improved leveling system of the above character which includes pump means adapted to be mechanically driven by the vehicle engine or which, alternatively, may be driven by means of an auxiliary electric motor.

It is a further object of the present invention to provide a leveling system of the above character which includes relief valve means for maintaining the internal hydraulic pressure within predetermined limits.

It is another object of the present invention to provide a leveling system of the above character wherein the individual suspension units thereof may comprise unitary assemblies consisting of combination suspension units and spring units or, alternatively, have each of the spring units remotely located from its associated suspension unit.

It is a further object of the present invention to provide a new and improved vehicle leveling system of the above character which, after initial assembly and adjustment, will be virtually service free.

It is yet another object of the present invention to provide a new and improved vehicle leveling system of the above character wherein the individual spring units thereof may be preloaded to provide any desired spring rate, whereby the leveling system will find universality of application on virtually every make and design of automotive vehicle.

It is another object of the present invention to provide a new and improved leveling system of the above described type which may be applied to either or both the forward and rear axles of a vehicle, and which may be provided with auxiliary load compensating means for minimizing changes in attitude of the vehicle body during heavily loaded conditions.

It is still another object of the present invention to provide a new and improved leveling system of the above character comprising a plurality of separable features, the particular number of which to be operatively installed on an automotive vehicle depending upon the weight and design of the vehicle, the desired degree of comfort in vehicle ride, and the investment which the vehicle operator is willing to make in improving the suspension of the vehicle.

It is still a further object of the present invention to provide a new and improved leveling system of the above character wherein the suspension units at the opposite ends of each axle may be interconnected to minimize any rolling movement of the vehicle body caused by irregularities in the surface of the roads over which the vehicle traverses.

It is another object of the present invention to provide a vehicle leveling system of the type hereinabove described wherein the suspension units at the front and rear ends of the vehicle along the same sides thereof may be interconnected to minimize any pitching movement of the vehicle body while the vehicle traverses any surface irregularities in the road.

It is still another object of the present invention to provide a new and improved leveling system of the above character which is entirely automatic and stable in operation.

It is a further object of the present invention to provide a new and improved leveling system of the above character which is durable in operation and may be easily installed on an automotive vehicle.

It is yet another object of the present invention to provide a new and improved vehicle leveling system of the above type that is of a relatively simple design, consists of readily available component parts, and is economical to commercially manufacture.

Other objects, features and advantages of the present invention will become apparent from the following detailed description, taken in conjunction with the accompanying drawings.

BRIEF DESCRIPTION OF THE DRAWINGS

FIGURE 1 is a schematic illustration of a preferred embodiment of the leveling system of the present invention;

FIGURE 2 is an enlarged longitudinal cross-sectional view of one of the suspension units incorporated in the leveling system shown in FIGURE 1;

FIGURE 3 is a longitudinal cross-sectional view of one of the spring units incorporated in the leveling system shown in FIGURE 1;

FIGURE 4 is a longitudinal cross-sectional view of one of the load compensating devices incorporated in the leveling system shown in FIGURE 1;

FIGURE 5 is a longitudinal cross-sectional view of an alternate embodiment of the present invention showing one of the suspension units and spring units combined in a unitized assembly;

FIGURE 6 is a fragmetary cross-sectional view taken substantially along the line 6—6 of FIGURE 5; and FIGURE 7 is a schematic illustration of an alternate means for supplying hydraulic actuating fluid to the leveling system illustrated in FIGURE 1.

DESCRIPTION OF THE PREFERRED EMBODIMENT

For convenience of description, the terms "upper," "lower," "front," "rear," and words of similar import will have reference to the various assemblies of the leveling system of the present invention described hereinafter in detail. Likewise, the terms "inner," "outer," and derivatives thereof will have reference to the geometric center of such assemblies and the various component parts thereof.

Generally speaking, the leveling system of the present invention comprises a plurality of separate but cooperative suspension assemblies each comprising a suspension unit and an associated spring unit. The suspension units are adapted to be interposed between the sprung and unsprung portions of an automotive vehicle for purposes of supporting, for example, the vehicle body on the front and/or rear axles of the vehicle. The suspension assemblies are adapted to operate in pairs, with either one or two pairs of assemblies being provided on a vehicle. For example, a pair of suspension assemblies may be mounted on the rear axle of a vehicle for purposes of supporting the rear end of the vehicle body thereon. Alternatively, a pair of the suspension assemblies may be mounted on the front axle of the vehicle for supporting the front end of the vehicle body thereon. Finally, a pair of the suspension assemblies may be mounted on both the front and rear axles of a vehicle for operatively supporting the entire vehicle body.

Each of the suspension assemblies is provided with a novel leveling valve mechanism which is communicable with a central source of pressurized hydraulic actuating fluid and is adapted to function to selectively communicate hydraulic fluid to and from the assemblies to automatically level the sprung portion of the vehicle regardless of the existing load and road conditions. As will later be described, the suspension assemblies are adapted to be incorporated in a variety of different types of applications or hydraulic circuits, either with or without the automatic leveling valves.

Referring now in detail to FIGURE 1 of the drawings, a vehicle leveling system 10, in accordance with a preferred embodiment of the present invention, is shown as comprising four separate, but cooperative suspension assemblies $S_1$, $S_2$, $S_3$ and $S_4$ which are adapted to be located one adjacent each of the four wheels of an automotive vehicle (not shown). The suspension assemblies $S_1$–$S_4$ comprise identical suspension units, 12, 14, 16 and 18, respectively, as well as identical cooperative spring units hereinafter to be described. In a preferred use of the present invention, the suspension units 12–18 are adapted to be interposed between the vehicle body and its associated supporting axles in place of the shock absorbers which are normally provided on automotive vehicles. Due to the fact that the suspension units 12–18 are identical in construction and operation, the hereinafter described detailed construction of the suspension unit 12, and the various component parts thereof, will apply to each of the other units 14, 16 and 18.

As best seen in FIGURE 2, the suspension unit 12 comprises a conventional telescopic, double acting shock absorber 20 having an internal pressure cylinder 22 which is enclosed within an outer tube 24 and is surrounded at the upper end thereof by radially inner and outer cylindrical housings 26 and 28, respectively. As illustrated, the radially inner housing 26 is fixedly secured to the shock absorber unit, 20, while the housing 28 is telescopically movable relative to the housing 26. The shock absorber 20 is provided with a reciprocal piston rod 30, the upper end portion 32 of which is adapted to be fixedly secured to the upper end of the housing 28, as will be described. The lower end of the shock absorber 20 is closed by an end cap 34 which is preferably connected to a suitable portion of the vehicle's front axle, such as by a ring-like attaching member 36. The upper end of the pressure cylinder 22 is closed by a piston rod guide member 38 that defines a central aperture 40 which slidingly and sealingly engages the periphery of the piston rod 30. The outer tube 24 is connected at its upper end to an annular collar member 42 which extends around the guide member 38 and defines a central opening 44 that is slightly larger in diameter than the piston rod 30 and is arranged coaxially thereof. The upper end of the inner housing 26 is formed with a radially inwardly extending upper end portion 46 which is received within an annular channel 48 extending around the outer periphery of the collar member 42.

Clampingly engaged with the top of the end portion 46 is the inner periphery of a flexible membrane or diaphragm member 50 which is preferably fabricated of synthetic rubber or other material that is impervious to oil or other actuating fluid which may be used in the leveling system 10. The inner periphery of the diaphragm member 50 is secured to the top of the portion 46 by means of an annular clamping plate 52 which is attached to the upper end of the housing 26 by means of a radially outwardly extending flange portion 54 formed on the upper end of the collar member 42. As shown in FIGURE 2, the diaphragm member 50 is of substantial radial dimension such that when the housing 28 is disposed in the longitudinal or axial position illustrated in this figure, the diaphragm member 50 hangs downwardly within an annular chamber 56 defined between the outer periphery of the housing 26 of the inner periphery of the housing 28.

The housing 28 comprises upper and lower sections 58 and 60, respectively, with the upper end of the housing section 60 being formed with a radially outwardly and downwardly extending flange portion 62 and the lower end of the housing section 58 being formed with a generally C-shaped locking portion 64 which is fixedly engaged with the portion 62 in a manner so as to rigidly secure the housing sections 58, 60 to one another. The radially outer periphery of the diaphragm member 50 is formed with an enlarged thickness or sealing portion 66 which is adapted to be clampingly engaged between the housing portions 62 and 64 and thereby provide gasket means to prevent any fluid leakage at the juncture of the housing sections 58 and 60. It will be seen that the diaphragm member 50 separates or provides partition means between the annular chamber 56 and a generally cylindrical chamber 68 defined within the upper end of the housing section 58. As will later be described, the chamber 68 is adapted to be filled with hydraulic fluid which is communicable with the interior of the shock absorber 20 through the opening 44, with the result that the shock absorber 20 uses the same actuating fluid as the leveling system 10.

The upper end of the housing section 58 is closed by a radially extending cover plate 70 which defines the upper end of the chamber 68 and is adapted to be fixedly secured to the housing section 58, as by welding or the like. The cover plate 70 is formed with an internally threaded opening 72 within which a housing section 74 of a later to be described automatic leveling valve assembly 76 is operatively mounted. The upper end portion 32 of the piston rod 20 is rigidly secured to the cover plate 70 and hence to the housing 28 by means of an annular collar member 78 disposed on the lower side of the plate 70, an annular rubber or similar resilient-type bumper member 80 being mounted on the lower side of the member 78 and adapted to be engaged by the upper end of the collar member 42 when the suspension unit 12 is deenergized or in a contracted condition. An upwardly extending mounting stud 81 is rigidly secured to the upper side of the cover plate 70 and is adapted to be fixedly attached to a suitable portion of the vehicle body. A cylindrical spacer member 82 is mounted on the stud 81 to facilitate mounting the suspension unit 12 and to maintain spacing between the vehicle body and the automatic leveling valve assembly 76.

A helical coil spring 84 is disposed within the chamber 68 circumjacent the piston rod 30. The spring 84 is fixedly secured at its lower end to the collar member 42 by means of an annular retaining member 86 which is secured between the upper side of the plate 52 and the flange 54, the retaining member 86 having a radially outwardly extending portion 88 which is attached to the lower end of the spring 84. The spring 84 is of a length such that when the housing 28 is disposed in the longitudinal position shown in FIGURE 2, the upper end of the spring 84 is spaced slightly below the lower side of the plate 70. The spring 84 is adapted to function in regulating the height of the vehicle body with respect to the unsprung portion of the vehicle, as will later be explained in the description of the operation of the suspension unit 12.

Referring now in detail to the construction of the leveling valve assembly 76, as best seen in FIGURE 2, the assembly 76 comprises a substantially hollow housing 90 which defines a central longitudinally extending bore 92 terminating at its upper end in an enlarged diameter damping chamber 94 that is closed by a threadably mounted plug 96. As will later be described, for certain types of applications wherein the suspension unit 12 is not provided with the automatic leveling valve assembly 76, the threaded opening 72 is adapted to be closed by means of any suitable closure plug, such as the plug 96, whereby to seal the upper end of the chamber 68. The bore 92 is communicable at its lower end with the interior of the chamber 68 and is also communicable with a pair of radially outwardly extending bores 98 and 100 defined by a pair of tubular or cylindrical housing sections 102 and 104, respectively. Reciprocally mounted within the bore 92 is a generally cylindrical-shaped spool valve member 106 which is formed with a reduced diameter medial portion 108 that defines an annular fluid passage 110 with the inner periphery of the bore 92. The valve member 106 is also formed with a longitudinally extending central bore 112 which is adapted to communicate with the passage 110 through a diametrically extending bore 114. The lower end of the bore 112 is communicable with the interior of the interior of the chamber 68 through an enlarged diameter bore portion 116 formed at the lower end of the valve member 106, while the upper end of the bore 112 is communicable with the interior of the chamber 94 through a relatively small diameter orifice portion 118. The upper end of the valve member 106 is provided with a snap-ring 120 or other suitable means for limiting downward movement of the meber 106 within the bore 92, and the lower end of the ember 106 is adapted to be fixedly secured to the upper end of the helical spring 84 by having the uppermost coil or convolution thereof extend through a suitable aperture 122 in the lower end of the member 106. The purpose of having the valve member 106 connected to the helical coil spring 84 is to assure that the member 106 will move longitudinally within the bore 92 only in response to relatively large changes in attitude of the vehicle body relative to the unsprung portions of the vehicle, as will later be described in detail.

The valve member 106 is designed such that the outer periphery thereof closes the inner ends of the bores 98 and 100 when the member 106 is disposed in the position shown in FIGURE 2; however, at such time as the member 106 moves upwardly or downwardly within the bore 92 such that the passage 110 is in registry with either of the bores 98 or 100, said bore will be communicable through the bores 114 and 112 in the valve member 106 with the chamber 68. It will be seen that when the passage 110 is aligned with one of the bores 98, 100, the other of said bores will be closed by the valve member 106. Accordingly, when the valve member 106 is moved to an upper position, only the bore 100 is communicable with the chamber 68, and when the member 106 is disposed in a lower position, only the bore 98 is communicable with the chamber 68, and at no time is there any communication between bores 98 and 100 through the bore 92. As will later be described, the bores 98 and 100 are adapted to communicate with an associated source of pressurized hydraulic actuating fluid, whereby reciprocation of the spool member 106 will selectively communicate hydraulic actuating fluid to and from the chamber 68. As will later be described in detail, by virtue of the relatively smaller diameter of the orifice portion 118 communicating the bore 114 with the chamber 94, the chamber 94 will normally be filled with actuating fluid, which fluid will act as a damping means for controlling the longitudinal movement of the valve member 106 within the bore 92.

As best seen in FIGURE 1, the suspension assemblies $S_1$, $S_2$, $S_3$ and $S_4$ comprise spring units 124, 126, 128 and 130 respectively, which, depending upon the particular installation, may be operatively mounted directly adjacent the suspension units 12, 14, 16 and 18, or, alternatively, at some remote location on the vehicle. The spring units 124–130 are preferably identical in construction and operation so that a detailed description of the spring unit 124 will apply to each of the other units 126, 128 and 130.

As shown in FIGURE 3, the spring unit 124 generally comprises a pair of cup-shaped confronting housings 132 and 134 and a flexible membrane or diaphragm member, generally designated 136, extending therebetween and dividing the interior of the spring unit 124 into separate upper and lower chambers 138 and 140. In a preferred construction, the diaphragm member 136 is formed with a reduced thickness portion 141 at an intermediate portion thereof and is fabricated of the same fluid impervious material as the aforedescribed diaphragm 50. The housing section 134 is formed with a radially outwardly extending flange section 142 at the upper end thereof, and the housing section 132 is formed with a generally C-shaped retaining section 144 around the lower end thereof, the sections 142 and 144 being clampingly engaged with one another in the manner shown in FIGURE 3 such that the housing sections 132, 134 comprise a single unitized assembly. The outer periphery of the diaphragm member 136 is formed with an enlarged thickness or sealing portion 146 which is clampingly secured between the housing sections 142 and 144, whereby to provide gasket or sealing means at the juncture of the housing sections 132, 134. The diaphragm member 136 is somewhat larger in diameter than the interior of the housing sections 132, 134 and thus is adapted to flex upwardly and downwardly within the spring unit 124, whereby to enlarge or decrease the relative volumes of the chambers 138 and 140, as shown in FIGURE 3.

In operation of the suspension assembly $S_1$, the chamber 140 is adapted to be preloaded or charged with a compressed gas, preferably air, by means of a valve assembly 148 mounted on the lower end of the housing section 134. In a typical application, this preloaded pressure is in the order of 70 p.s.i. but may vary from one application to another. The housing section 132 is provided with a fluid fitting 150 mounted in a suitable opening 152 and adapted to be communicable through fluid circuit means later to be described with a fluid fitting 154 which is mounted in an opening 156 in the side of the housing section 58 of the suspension unit 12 with the result that the chamber 68 in the suspension unit 12 is communicable with the chamber 138 in the spring unit 124. The chambers 68 and 138 are intended to contain a preselected volume of a suitable hydraulic actuating fluid, such as oil, the quantity of fluid being fixed in the case wherein the automatic leveling valve assembly 76 is omitted from the suspension unit 12, and being variable when the valve assembly 76 is provided on the suspension unit 12. In the former case, as the vehicle traverses an irregularity in a road surface, the shock absorber 20 and housing 26 will move upwardly within the chamber 68, thereby contracting the chamber 68 and forcing hydraulic fluid normally contained therewithin to the chamber 138 in the spring unit 124; however, the fluid flowing into the chamber 138 is resisted by the compressed gas within the chamber 140, with the result that the compressed gas acts as a spring means to resist the flow of fluid into the chamber 138 and thus resist upward movement of the shock absorber 20 and the housing 26 within the chamber 68. By properly selecting and controlling the volume and pressure of gas within the chamber 140, the spring rate of the suspension system may be readily controlled and changed or adjusted when desired, and once the chamber 140 has been initially charged or preloaded, the suspension system will be entirely maintenance free.

In the case wherein the suspension unit 12 is provided with the automatic leveling valve assembly 76, as shown in FIGURE 2, the valve housing sections 102 and 104 are communicable with a source of pressurized actuating fluid and with a fluid reservoir, respectively, both of which are hereinafter described. During such time as the actuating fluid is not under pressure, the weight of the unsprung portion of the vehicle will bias the housing 28 downwardly until the bumper member 80 engages the upper end of the collar member 42. During such conditions, the coil spring 84 will force the valve spool member 106 upwardly within the bore 92 to a position wherein the passage 110 is in registry with the bore 98. At such time as the pressure of the actuating fluid increases a predetermined amount, actuating fluid will flow through the bore 98 in the valve housing 90, and thereafter through the passage 110 and bore 112 in the spool valve member 106, and into the interior of the chamber 68. The fluid pressure within the chamber 68 will thereby increase and at a certain pressure will cause the housing member 28 to move upwardly with respect to the housing 26, thereby biasing the sprung portion of the vehicle supported on the unit 12 upwardly until said vehicle portion is disposed at a predetermined height, this height depending upon the weight of the vehicle and the pressure of air or gas within the chamber 140 of the associated spring unit. When the housing 28 reaches a predetermined height relative to the housing 26, an equilibrium condition will exist and the pressure of actuating fluid within the chamber 68 will not change as long as the weight of the vehicle remains unchanged. As the housing 28, and thus the valve housing 90 connected thereto, move upwardly relative to the housing 26, the passage 110 of the spool valve member 106 which is connected to the coil spring 84 will move out of alignment with respect to the bore 98, whereby the valve member 106 will block communication between the bore 98 and the chamber 68 to prevent any further actuating fluid from flowing into the chamber 68, thus maintaining the aforesaid equilibrium condition.

In the event the weight of the vehicle is decreased from the time of the equilibrium condition, the housing 26 will move upwardly due to the internal pressure within the chamber 68. When this occurs, the spool valve member 106 will remain at a relatively constant height with respect to upward movement of the valve housing 90. Accordingly, the passage 110 will move into registry with the bore 100 so that actuating fluid within the chamber 68 may flow upwardly through the bore 112 and thereafter through the bore 114 and the bore 100 in the housing 90. This actuating fluid will then be returned to the fluid reservoir through circuit means later to be described. It will thus be seen that the spool valve member 106 will move upwardly and downwardly within the bore 92 in accordance with the weight of the vehicle, and that as this weight changes, hydraulic actuating fluid will be either pumped to or from the chamber 68 to maintain the vehicle at a predetermined height regardless of the loading conditions imposed thereon.

It will be noted that in the event the vehicle traverses a road surface irregularity or bump, the shock-absorber 20 and housing 26 will move upwardly with respect to the housing 28 for just a brief moment. By virtue of the damping characteristics provided by the chamber 94, the spool valve member 106 will be prevented from moving longitudinally within the bore 92 in response to a sudden change in pressure within the chamber 68 so that no actuating fluid will be communicated to or from the chamber 68.

For certain types of vehicle installations, the operatively associated suspension and spring units may be combined into individual unitized assemblies, whereby to facilitate assembly and operative mounting of these units. An exemplary embodiment of such a unitized assembly combining the principles of the suspension and spring units hereinbefore described is shown in FIGURE 5 and generally designated by the numeral 158. Basically, the unit 158 is a combination of the suspension unit 12 shown in FIGURE 2 and the spring unit 124 shown in FIGURE 3, and all component parts of the unit 158 which are common to the above described units 12 and 124 are designated by like numerals having a prime (') suffix.

As illustrated in FIGURE 5, the unit 158 comprises a basic telescopic, double acting shock absorber 20' having a pressure cylinder 22' enclosed within an outer tube 24' and provided with a reciprocable piston rod 30'. The unit 158 also comprises an inner housing 26' and an outer housing 28' having an upper housing section 58' and a lower housing section 60'. A flexible membrane or diaphragm member 50' has its inner periphery clampingly secured to the upper end portion 46' of the inner housing 26' by a clamping plate 52', the radially outermost portion of the diaphragm member 50' being clampingly secured between the housing portions 62' and 64' on the housing sections 60' and 58', respectively. The housing section 58' defines an internal chamber 68' which is closed at its lower end by the diaphragm member 50' and is communicable with the interior of the shock absorber 20' through suitable forces 160 formed in the collar member 42'. A cylindrical fluid fitting 161 is mounted within a suitable opening in the housing section 58' and is adapted to be communicable with suitable hydraulic circuitry connecting a pair of the units 158 which may, for example, be mounted on opposite ends of a vehicle axle, whereby the two units 158 are operated simultaneously to control the height of that portion of the vehicle supported upon the units 158. Such operation will be described in more detail in connection with the hydraulic circuitry incorporated in the leveling system 10 of the present invention. A helical coil spring 84' is provided within the chamber 68' circumjacent the piston rod 30' and adapted to be fixedly secured at its lower end by means of a suitable retaining plate 86'. The upper end of the housing section 58' is formed with a generally hemispherical cup-shaped section 162 which is analogous to the housing section 134 of the spring unit 124, as will be apparent. The housing section 162 is formed with a generally C-shaped section 164 around the upper end thereof which is adapted to clampingly engage an outwardly extending flange portion 166 formed around the lower end of a cup-shaped housing section 132', whereby to fixedly secure the housing sections 162 and 132'. A flexible diaphragm member 136' divides the interior of the housing sections 162, 132' into upper and lower chambers 168 and 170, the radially outermost portion 146' of the diaphragm member 136' being clampingly secured between the housing portions 164 and 166. The housing section 162 is provided with a generally cup-shaped partition member 172, the outer periphery of which is nested within a recessed portion 174 in the housing section 162. The partition member 172 is formed with a central opening 176 and with radially outwardly disposed opening 179 and 180 which are adapted to communicate the interior of the chamber 170 with the chamber 68'. The housing section 162 is formed with a bleed opening 182 which is adapted to be normally closed by a suitable plug 184 threadably mounted in a fitting 186 secured to the outer surface of the housing section 162.

The chamber 168 is adapted to be filled or charged with compressed air or gas through a suitable valve assembly 188 that is mounted on the housing section 132', whereby to selectively control the relative volume of the chambers 168 and 170, as will be described. A longitudinally extending mounting stud or rod 190 is fixedly secured to the upper end of the housing section 132' by means of a suitable mounting plate 192 which is of a complementary configuration with respect to the upper end of the housing section 132' and is rigidly secured thereto, as by welding or the like. The mounting stud 190 is adapted to be secured to the body or other sprung portion of the vehicle, and an attaching member 36' on the lower end of the shock absorber 20' is adapted to be secured to an unsprung portion of the vehicle, such that actuation of the unit 158 will selectively control the attitude of the vehicle body relative to the unsprung portion.

The unit 158 is provided with a valve assembly 76' that is mounted on the radially inner surface of the housing section 58' and comprises valve housing 90' that defines a central longitudinally extending bore 92'. Reciprocally mounted within the bore 92' is a spool valve member 106' which is formed with a central recess 108' and a longitudinally extending bore 112' which is adapted to communicate a diametrically extending bore 114' with the interior of the chamber 68'. The housing 90' is formed with outwardly extending bores 98' and 100' which are aligned with suitable openings in the side of the housing section 58' and are communicable with hydraulic conduits 194 and 196 through suitable fluid fittings 198 and 200, respectively. Mounted on the upper end of the housing 90' is a generally cup-shaped cover member 202 having an orifice 204 formed in the upper end thereof and defining a compartment 206 with the upper end of the housing 90'. The compartment 206 is adapted to contain hydraulic fluid which acts as a damping means to limit reciprocal movement of the spool valve member 106' within the bore 92'. As was the case with the suspension unit 12, the lower end of the valve member 106' is fixedly secured to the uppermost convolution of the coil spring 84', as seen at 208.

The upper end of the piston rod 30' is adapted to be fixedly secured within the housing section 58' by means of a mounting bracket, best seen in FIGURE 6 and generally designated by the numeral 210. The bracket 210 is formed with a central opening 212 in the lower end thereof through which the upper end of the piston rod 30' extends and is fixedly secured by means of suitable retaining means 214, 216 disposed on the upper side of the bracket 210. The radially outer ends of the bracket 210 are formed with mounting sections 218 and 220 which are adapted to be rigidly secured, as by welding or the like, to the inner periphery of the housing section 58', as seen at 222 in FIGURE 6, with the result that the piston rod 30' is fixedly secured to the housing section 58' and any reciprocal movement of the section 58' will result in simultaneous movement of the piston rod 30'.

Generally speaking, operation of the combination suspension-spring unit 158 is identical to the operation of the suspension unit 12 and associated spring unit 124 hereinabove described. The primary difference between the two constructions resides in the fact that there is no fluid conduit means between the interior of the chamber 68' and the chamber 170 since hydraulic fluid is free to flow between these chambers through the openings 176, 178 and 180 in accordance with the pressure of air or gas within the chamber 168 and the specific loading conditions imposed upon the associated vehicle.

In order to provide for a source of pressurized hydraulic fluid for the leveling system 10, it is necessary to provide some type of hydraulic fluid reservoir and pumping means for selectively communicating fluid contained within the reservoir to and from the suspension units 12–18. By way of example, such means is illustrated in FIGURE 1 and comprises a suitable fluid reservoir or tank 224 and fluid pump 226, the latter of which is adapted to operate during operation of the vehicle engine as, for example, through a suitable V-belt drive arrangement for transmitting motive power from the engine crank shaft to the pump 226. The pump 226 is communicable through a T-fitting which, for purposes of description, is representatively designated by $T_1$, and through suitable fluid conduit 228 with a relief valve mechanism 230 which is in turn communicable with the reservoir 224 through a conduit 232. The valve 230 is adapted to permit the flow of hydraulic fluid from the pump 226 to the reservoir 224 only in the direction of the arrow 234 in FIGURE 1 during such time as the spool valve member(s) 106 is disposed in a position blocking the flow of hydraulic actuating fluid to the suspension assemblies $S_1$–$S_4$, thereby assuring that the fluid pressure of the system 10 does not exceed a predetermined value. Thus, during the time the suspension assemblies $S_1$–$S_4$ are in a state of equilibrium or balance, hydraulic actuating fluid will be merely recirculated to and from the reservoir 224 by means of the pump 226. The pump 226 has suitable inlet and outlet conduits 236 and 238, respectively, the former of which is communicable with the conduit 228 through the T-fitting $T_1$, and the latter of which is communicable with the reservoir 224 through another T-fitting $T_2$ and a suitable conduit 240.

FIGURE 7 illustrates an alternate means for supplying a source of hydraulic fluid to the suspension units 12–18. In this system, hydraulic fluid is adapted to be communicated to and from the inlet and outlet conduits 236 and 238, respectively, by means of a suitable pump 242 which is of substantially the same construction as the pump 226 with the exception that the pump 242 is actuatable upon energization of an associated electric motor 244 and pressure responsive switch mechanism 246. As illustrated, the switch mechanism 246 is communicable through a conduit 248 with the fitting $T_1$ and is adapted to control the flow of electric current to the electric motor 244 through conventional electric circuit means illustrated at 250 in FIGURE 7. It will be noted that although in a preferred construction of the present invention the pump 242 is driven by the engine of the associated automotive vehicle, the pumping arrangement shown in FIGURE 7 wherein the pump 242 is driven by the electric motor 244 will find certain useful application on vehicles wherein it is extremely difficult to mount the pump 242 adjacent the engine, thus requiring an auxiliary drive means such as the motor 244.

The leveling system 10 of the present invention incorporates a pair of load compensator devices 252 and 254 which generally function to control the flow of hydraulic actuating fluid between the suspension assemblies disposed along the opposite sides of the vehicle to control pitching movement of the vehicle body. The compensator devices 252, 254 are preferably identical in construction and operation so that a detailed description of the compensator 252 is applicable to the other of said devices 254.

As best seen in FIGURE 9, the load compensator 252 comprises a pair of generally cup-shaped housing sections 256 and 258 which are disposed in mutual confronting relationship with each other. The housing sections 256, 258 are formed with outwardly extending flange portions 260 and 262 that are adapted to be clampingly secured to one another by means of a suitable C-shaped annular clamping ring 264 which extends around the housing sections 256, 258. A flexible membrane or diaphragm member 266, which is preferably fabricated of the same material as the diaphragm 50, is disposed within the housing sections 256, 258 and divides the interior of the compensator 252 into upper and lower chambers 268 and 270, respectively. The outer periphery of the diaphragm member 266 is formed with an enlarged thickness sealing section 272 which is adapted to be clampingly secured between the flange portions 260 and 262 and thereby provide a fluid tight seal at the juncture of the housing sections 256 and 258. The medial portion of the diaphragm member 266 is clampingly disposed between a pair of annular plates 274 and 276 which are rigidly secured to one another by a suitable screw, bolt or the like 278 and associated nut 280 which are disposed centrally of the compensator 252. A pair of helical coil springs 282 and 284 are disposed within the chambers 268 and 270, respectively, the outer ends of the springs 282, 284 abutting against the upper and lower ends of the housing sections 256 and 258, respectively. Suitable annular ridge portions 286 and 288 are formed in the housing sections 256, 258 for maintaining the outer ends of the coil springs 282, 284 centrally or coaxially arranged within the chambers 268 and 270. The inner ends of the springs 282, 284 are adapted to bear against the plates 274, 276, and a pair of annular ridge portions 290 and 292 are formed in the plates 274 and 276, respectively, for assuring that the inner ends of the springs 282, 284 are centrally located within the chambers 268, 270. As illustrated in FIGURE 9, the diaphragm member 266 is somewhat larger in diameter than the interior of the chambers 268, 270 and is thereby adapted to flex upwardly and downwardly within the housing sections 256 and 258 in response to differential fluid pressure within the chambers 268, 270, as will later be described. Hydraulic fluid is adapted to be communicated to and from the chambers 268, 270 through fluid fittings 294 and 296 which are mounted within suitable aligned openings 298 and 300 in the housing sections 256 and 258, respectively.

In operation, the load compensators 252, 254 are adapted to be operatively associated with the suspension assemblies $S_1$, $S_3$ and $S_2$, $S_4$, respectively. More particularly and as illustrated in FIGURE 1, the fittings 294 of the compensators 252, 254 are adapted to be communicable with the chambers 138 of the spring units 128 and 130 of the suspension assemblies $S_3$ and $S_4$, respectively. Similarly, the fittings 296 are adapted to be communicable with the chambers 138 of the spring units 124 and 126 of the suspension assemblies $S_1$ and $S_2$, respectively. During normal operating conditions, actuating fluid in the chambers 268 and 270 will maintain the diaphragms 266 in a predetermined position within the load compensators 252 and 254. This position is a function of the spring rate and free height of the coil springs 282 and 284 disposed within the chambers 268 and 270. When the fluid pressures on both sides of the diaphragms 266 are different, due to different loading conditions on the front and rear ends of the vehicle, the static position of the diaphragms 266 will be determined by the equilibrium between the fluid pressures and the spring forces. For example, when the fluid pressure within the chamber 268 is greater than the pressure within the chamber 270, the diaphragms 266 will move downwardly in FIGURE 4 until a balanced condition exists.

When the front or rear wheels of the vehicle engage a road surface irregularity, a certain amount of actuating fluid will be forced from the suspension assemblies $S_1$, $S_2$ or $S_3$, $S_4$, through the hydraulic circuitry later to be described, to the chambers 268 or 270, depending upon which of the wheels engage the irregularity. For example, in a situation where the front wheels of the vehicle engage the irregularity, due to contraction of the suspension units 12 and 14, actuating fluid will flow from the suspension assemblies $S_1$, $S_2$ into the chambers 268 of the load compensators 252 and 254, respectively, with the result that the diaphragms 266 will move toward the chambers 270 to force actuating fluid out of the chambers 270. It will be apparent that during normal operating conditions, the amount of actuating fluid forced out of the chambers 270 will be equal to that forced into the chambers 268. This fluid which is forced from the chambers 270 will flow through suitable hydraulic circuitry into the suspension units 16 and 18 of the suspension assemblies $S_3$ and $S_4$, with the result that said units will expand and thereby elevate the rear end of the vehicle a predetermined amount. Thus, there is provided an interconnection between the front and rear suspension units of the vehicle which functions to maintain the attitude of the vehicle in a substantially horizontal configuration as the vehicle traverses a relatively irregular road surface. By virtue of the fact that either the front or rear pair of suspension units will expand in response to the other of said pair of units contracting upon engagement of the associated vehicle wheels with a surface irregularity, the pitching movement of the vehicle body usually attendant as the vehicle traverses irregular road surfaces is considerably reduced, thereby substantially enhancing the comfort of the vehicle ride. A particular feature of the above described load compensators 252 and 254 resides in the fact that a relatively level ride is maintained without an excessive flow of actuating fluid between the suspension units on the same side of the vehicle. This has been found to be particularly important under conditions of unequal loading between the front and rear ends of the vehicle.

Referring now to the hydraulic circuit incorporated in the leveling system 10 of the present invention, as illustrated in FIGURE 1, the suspension assemblies $S_1$ and $S_3$ are adapted to be communicable through a suitable hydraulic conduit $C_1$, while the suspension assemblies $S_2$ and $S_4$ are communicable through conduit $C_2$. More particularly, the forward end of the conduit $C_1$ is connected to a conduit $C_3$ through a suitable T-fitting $T_3$, the conduit $C_3$ being connected to the fluid fitting 154 on the suspension unit 12. In a similar manner, the rear end of the conduit $C_1$ is connected through a T-fitting $T_4$ and a conduit $C_4$ with the fluid fitting 154 on the suspension unit 16. Thus, it will be seen that the chambers 68 of the suspension units 12 and 16 are communicable with each other. In a like manner, the forward end of the conduit $C_2$ is connected to the suspension unit 14 through a T-fitting $T_5$ and conduit $C_5$, while the rear end of the conduit $C_2$ is connected to the suspension unit 18 through T-fitting $T_6$ and conduit $C_6$. As illustrated, the load compensators 252 and 254 are communicable with the conduits $C_1$ and $C_2$, respectively, in a manner such that the rear ends of the conduits $C_1$, $C_2$ are communicable through the fittings 296 with the chambers 270, and the forward ends of the conduits $C_1$, $C_2$ are communicable with the chambers 268 through the fittings 294.

The suspension assemblies $S_1$ and $S_2$ are adapted to be communicable through condut $C_7$ which extends between the fittings $T_3$ and $T_5$, and the suspension assemblies $S_3$ and $S_4$ are communicable through conduit $C_8$ which extends between fittings $T_4$ and $T_6$. The housing sections 102 of the valve assemblies 76 associated with the suspension units 12 and 14 are communicable through conduit $C_9$, and the housing sections 104 of said valve assemblies 76 are communicable through conduit $C_{10}$. Similarly, the housing sections 102 of the valve assemblies 76 associated with the suspension units 16 and 18 are communicable through conduit $C_{11}$, and housing sections 104 of said valve assemblies are communicable through conduit $C_{12}$. Finally, the conduits $C_{11}$ and $C_9$ are communicable with the fluid outlet line 238 through conduit $C_{14}$ which is connected at its forward end through a T-fitting $T_7$ with the conduit $C_9$, and at its rear end with the conduit $C_{11}$ through a T-fitting $T_8$. The fluid outlet line 238 is communicable with the conduit $C_{14}$ through T-fitting $T_9$, and likewise, the fluid inlet line 236 is communicable with the conduits $C_{10}$ and $C_{12}$ through conduit $C_{15}$ which is connected at its upper end through T-fitting $T_{10}$ with conduit $C_{10}$, and at its lower end with conduit $C_{12}$ through T-fitting $T_{10}$. The fluid inlet line 236 is communicable with a medial portion of the conduit $C_{15}$ through T-fitting $T_{12}$. As illustrated in FIGURE 1, the spring units 124 and 126 are communicable with the conduits $C_3$ and $C_5$ through T-fittings $T_{13}$ and $T_{14}$, respectively, and the spring units 128 and 130 are communicable with the conduits $C_4$ and $C_6$ through T-fittings $T_{15}$ and $T_{16}$, respectively.

To facilitate correlating the various suspension assemblies $S_1$–$S_4$ and the other component parts of the leveling system 10, a brief description of the overall operation thereof will now be given.

Assuming the conditions that the spring units 124–130 are charged with a predetermined volume of pressurized gas, initially, the vehicle engine is energized, resulting in actuation of the pump 226 to maintain actuating fluid at a predetermined fluid pressure in the fluid outlet line 238. Upon actuation of the pump 226, pressurized fluid is communicated through the conduits $C_{14}$, $C_8$ and $C_9$ to the suspension assemblies $S_1$, $S_2$ and $S_3$, $S_4$, and more particularly to the housing sections 102 of the valve assemblies 76 associated with the suspension units 12–14. As previously mentioned, during the time the actuating fluid is not under pressure, the weight of the vehicle biases the housings 28 downwardly, with the result that the coil springs 84 maintain the passages 110 of the valve members 106 in registry with the bores 98. As the fluid pressure increases, the actuating fluid will flow from the fluid outlet line 238 through the conduits $C_{14}$, $C_8$ and $C_9$ into the chambers 68 of the suspension units 12–14. The increase in fluid pressure within the chambers 68 will cause the housing members 28 to move upwardly with respect to the housing 26 until a state of equilibrium is achieved between the fluid pressure within the chambers 68 and the gas or air pressure within the spring units 124–130. The vehicle body will thereby be maintained in a substantially horizontal attitude regardless of the loading conditions imposed thereon. That is, the fluid pressure within the chamber 68 of the suspension units 12–18 will remain in equilibrium with the gas or air pressure within the chambers 140 of the spring units 124–130. At such time as the loading conditions imposed on the vehicle are changed, for example, when the rear end of the vehicle is heavily loaded, the suspension units 16 and 18 will be compressed under the increase in weight, whereby the housings 28 will move downwardly, with the result that the passages 110 of the spool valve members 106 will move into registry with the bores 98. When this occurs, actuating fluid will be pumped into the chambers 68 to effectuate expansion of the units 16 and 18 to a position wherein the rear end of the vehicle body is raised to a position wherein the body is disposed in a level attitude.

At such time as the aforesaid load on the rear end of the vehicle is removed or reduced in magnitude, the suspension units 16 and 18 will expand slightly due to the fluid pressure within the chambers 68 thereof. As this occurs, the valve housings 90 will move upwardly along with the housings 28 until such time as the passages 110 register with the bores 100, with the result that actuating fluid will flow out of the chambers 68 of the units 16, 18 and back to the inlet conduit 236 through the conduits $C_7$, $C_{12}$ and $C_{15}$, as illustrated in FIGURE 1. It will thus be seen that the suspension units $S_1$–$S_4$ will automatically function to maintain the vehicle body in a level attitude, regardless of the loading conditions imposed thereon.

As illustrated, the load compensators 252 and 254 are operatively connected in the leveling system 10 by means of the conduits $C_1$ and $C_2$ which are communicable with the conduits $C_3$ and $C_5$ at the forward end of the vehicle and with the conduits $C_4$ and $C_6$ at the rear end of the vehicle. Accordingly, the front and rear suspension assemblies $S_1$, $S_2$ and $S_3$, $S_4$, respectively, are interconnected along the opposite sides of the vehicle. As previously mentioned, by thus interconnecting the suspension assemblies along the same sides of the vehicle, when the front wheels of the vehicle engage an object, actuating fluid from the front suspension assemblies $S_1$, $S_2$ will be communicated through the conduits $C_1$ and $C_2$ toward the rear suspension assemblies $S_3$, $S_4$, and vice versa, in order to maintain the vehicle in a level attitude and to reduce any pitching movement of the vehicle body as the vehicle traverses irregular road surfaces. By virtue of the provision of the load compensators 252 and 254, the quantity of actuating fluid which flows through the conduits $C_1$ and $C_2$ is minimized.

A particular feature of interconnecting the front and rear suspension assemblies along each side of the vehicle resides in the fact that a lower spring rate is achieved since both the spring units on the same side of the vehicle will function to receive actuating fluid from one of the suspension units. This will be achieved with or without the provision of the load compensators 252, 254, and the end result is that a smooth and comfortable ride is achieved by reducing the spring rate and a substantial amount of any pitching movement of the vehicle body.

It will be seen that the suspension assemblies $S_1$, $S_2$ and $S_3$, $S_4$ are interconnected by means of the conduits $C_7$ and $C_8$, respectively, whereby the suspension assemblies at the opposite sides of the vehicle are interconnected. The purpose of such an interconnection is to enable both spring units at the front or rear end of the vehicle to absorb actuating fluid from one of the suspension units on that end of the vehicle, whereby to minimize the spring rate of the leveling system. Although in theory such an arrangement permits a reduction in spring rate of up to 50%, it will be apparent that such a theoretical value will seldom be achieved since the interconnecting conduits offer at least a certain amount of resistance to the free flow of actuating fluid between the suspension assemblies. The results of interconnecting the front and rear suspension assemblies $S_1$, $S_2$ and $S_3$, $S_4$ through the conduits $C_7$ and $C_8$ is that rolling movement of the vehicle body is considerably reduced as the vehicle traverses an irregular road surface. For example, when one of the left wheels of the vehicle engages an object, the suspension unit adjacent that wheel will be compressed and the left side of the vehicle will have a tendency to be elevated. Due to the compression of the left unit, a certain quantity of actuating fluid will flow through the conduits $C_7$ and/or $C_8$ to the suspension unit on the right side of the vehicle. Assuming that the load on the suspension units on the right side of the vehicle remains unchanged, the additional actuating fluid that is communicated thereto will result in expansion of the right hand unit, thus lifting the right side of the vehicle, with the result that the car will be lifted on both sides instead of rolling as the vehicle wheels engage an object.

Although the leveling system 10 of the present invention shown in FIGURE 1 embodies a number of different features such as the front and rear interconnection of suspension units, side by side interconnection of suspension units, load compensators, and automatic leveling valves, the present invention is not intended to be limited in scope to a single system combining all of these features. Instead, it is contemplated that the system 10 may be modified in a number of different ways by omitting one or more of the aforesaid features, and that such modified systems will operate in accordance with the basic principles of the leveling system 10 hereinabove described. By way of example, several different ways in which the basic system 10 can be modified are hereinafter described, with each of the modified systems incorporating the fundamental teachings of the leveling system 10 so that particular reference will be made to FIGURE 1 wherein the system 10 is illustrated.

One example of how the leveling system 10 may be modified is to omit the load compensators 252, 254 and the conduits $C_1$ and $C_2$ which communicate the suspension assemblies at the front and rear end of the vehicle along the opposite sides thereof. Such a modified system will operate in essentially the same manner as the leveling system 10, with the exception that actuating fluid will not be communicated between the suspension assemblies at the front and rear ends of the vehicle. Accordingly, such a modified system will not give as comfortable a ride as is provided by the system 10 since there is no means provided for reducing pitching movement of the vehicle body.

Another example of how the leveling system 10 may be modified is to omit the automatic leveling valve assembly 76 on the suspension units at either the front or rear end of the vehicle, and to omit the attendant conduits $C_9$, $C_{10}$ or $C_{11}$, $C_{12}$ interconnecting the valve assemblies at the front and rear end of the vehicle. With this arrangement, the automatic leveling feature is provided at only one end of the vehicle, although the advantages of interconnecting the suspension assemblies along the opposite ends of each axle are retained. It will be apparent, of course, that in such a system, the conduits $C_{14}$ and $C_{15}$ will be communicable only with those conduits $C_9$, $C_{10}$ or $C_{11}$, $C_{12}$ extending between the existing valve assemblies 76. It is contemplated that this system will be particularly applicable wherein the loading conditions on one end of the vehicle remain relatively contant.

Still another example of how the leveling system 10 may be modified is to omit the two suspension assemblies and attendant fluid circuitry at one end of the vehicle. For example, the front end of the vehicle may have the suspension assemblies $S_1$ and $S_2$ omitted and replaced with conventional vehicle springs and/or shock absorbers, with the result that the pump 226 and reservoir 224 will be communicable through the inlet and outlet lines 236 and 238, respectively, with only the suspension assemblies $S_2$ and $S_4$ at the rear end of the vehicle. It will be apparent, of course, that such an arrangement is not provided with the aforedescribed front and rear interconnection to reduce pitching movement of the vehicle body. It is contemplated that this type of system will find particularly useful application in the replacement market or where it is desired to augment the suspension system of a vehicle so that the vehicle will be adapted to carry relatively heavy loads at the rear end thereof.

Yet another example of how the leveling system 10 may be modified is to entirely omit the leveling valve assemblies 76 on each of the suspension units 12–18, and to omit the pump 226 and reservoir 224 and the fluid conduits $C_9$, $C_{10}$, $C_{11}$, $C_{12}$, $C_{14}$ and $C_{15}$ which communicate the valve assemblies 76 with each other and with the pump 226. This arrangement provides a leveling system comprising the four suspension assemblies $S_1$–$S_4$ with the conduits $C_3$, $C_5$ and $C_7$ connecting the assemblies $S_1$ and $S_2$, and conduits $C_4$, $C_6$ and $C_8$ connecting the assemblies $S_3$ and $S_4$. Also, this arrangement includes the conduits $C_1$ and $C_2$ interconnecting the suspension assemblies at the front and rear end of the vehicle along the opposite sides thereof. Depending on the type of application, such a system may or may not be provided with the load compensators 252, 254, and/or have the conduits $C_7$ and $C_8$ omitted, whereby to control the roll and pitch reducing characteristics of the system.

Together with the above described examples of how the leveling system 10 may be modified, it will be noted that the basic spring and suspension units (or combined units), along with the automatic leveling valve assemblies 76, may be used as suspension components in various other types of applications. It is contemplated that the combined units may be applied in virtually every instance where a suspension-spring device is required, in either a horizontal, vertical or inverted application. Since the size of the units may be adjusted to suit any loading conditions, and the size of the preload charge of air or gas may be preselected so that any spring rate is achieved, such units will find universality of application. Use of the load compensators 252, 254 is also not limited to the above described leveling system, and it is contemplated that such devices can be used virtually anywhere it is desired to connect two separate hydraulic systems having different operating pressures.

It may be possible in the leveling system 10 illustrated in FIGURE 1 to obtain special suspension characteristics by incorporating certain restricted orifices or valves in the system. For example, restricted orifices may be provided in the leveling system 10 at the locations designated by the numeral 302. By choosing the orifices of a predetermined restrictive size, it is possible to reduce the flow of actuating fluid without adversely affecting the automatic leveling characteristics of the system. As another alternative, the suspension units at the front and rear ends of the vehicle may be connected with the conduits $C_1$ and $C_2$ through hydraulic conduits 304, 306, 308 and 310, as indicated by the dotted lines in FIGURE 1, whereby to enhance the pitch reducing characteristics of the leveling system 10.

It will be seen from the foregoing description that the present invention provides a new and improved vehicle leveling system which is adapted to overcome the problems heretofore encountered in previously known and used suspension systems having conventional leaf springs, coil springs, air cylinders or relatively complex hydraulic piston and cylinder devices. More particularly, the present invention provides a leveling system that is characterized by a low spring rate and which is adapted to minimize any rolling or pitching movement of the vehicle body as the vehicle traverses a relatively bumpy road, the automatically leveling feature of the system 10 functioning to maintain the vehicle body at a predetermined height regardless of the loading conditions imposed thereon. One particularly important feature of the present invention resides in the provision of the spring units which may be precharged with pressurized gas so as to selectively and adjustably control the spring rate of the vehicle. Another feature of the present invention resides in the provision of the road compensators which minimize the quantity of actuating fluid transmitted between the suspension assemblies along the same side of the vehicle, yet minimizing to the extreme any pitching movement of the vehicle body. Still another feature of the present invention resides in the fact that the various component parts thereof may comprise thin-walled stampings, as opposed to forged or machined parts of the type incorporated in heretofore known and used vehicle suspension systems, thereby minimizing manufacturing expenses. In addition to the above features, the present invention utilizes the system's actuating fluid for the associated shock absorbers, thereby substantially eliminating cavitation and aeration noise that occurs in conventional shock absorbers under certain operating conditions. One additional feature of the present invention which is of particular importance resides in the fact that the leveling system 10 may have the various component sections or members thereof omitted for certain types of installations, thereby providing for universality of application.

While it will be apparent that the embodiments illustrated herein are well calculated to fulfill the objects above stated, it will be appreciated that leveling system 10 of the present invention is susceptible to modification, variation and change without departing from the proper scope or fair meaning of the subjoined claims.

I claim:

1. In a leveling system for controlling the attitude between first and second portions of a vehicle, shock absorber means having attachment means connectable to one of the vehicle portions, first housing means defining a fluid chamber and having a mounting portion thereof operatively connected to said shock absorber means and attachment means connectable to the other of the vehicle portions, whereby expansion and contraction of said chamber effects preselected separation between said mounting portion and said attachment means and thereby changes the attitude between said first and second vehicle portions, spring means comprising second housing means charged with a preselected volume of pressurized gas, valve means for selectively communicating actuating fluid to and from said fluid chamber and means for actuating said valve means in response to differential movement between said housing means and said shock absorbing means, and flexible partition means having one side thereof exposed to the pressure conditions in said fluid chamber and the opposite side thereof exposed to the pressure conditions of said volume of gas, whereby contraction of said fluid chamber will result in fluid being transmitted out of said chamber and thereby bias said partition means toward said second housing means against the resistance of the pressurized gas therewithin.

2. A vehicle leveling system as set forth in claim 1 which includes flexible diaphragm means extending between said first housing means and said shock absorber means and which defines a portion of said fluid chamber.

3. A leveling system as set forth in claim 1 wherein said spring means comprises first and second generally cup-shaped housings, and wherein said flexible partition means comprises a resilient diaphragm member extending between said housing sections and clampingly secured between mutually confronting portions thereof.

4. A leveling system as set forth in claim 1 wherein said spring means is mounted directly on one end of said fluid chamber and is communicable therewith through aperture means defined by one of said housing means.

5. A leveling system as set forth in claim 1 wherein said shock absorber means comprises a direct acting hydraulic shock absorber.

6. A leveling system as set forth in claim 5 wherein said fluid chamber is communicable with said shock absorber.

7. A leveling system as set forth in claim 1 wherein said valve means comprises a valve housing defining a valve bore, a valve member reciprocable within said bore, inlet and outlet passage means for communicating actuating fluid to and from said bore, and means for moving said valve member into alignment with said passage means in response to relative movement between said first housing means and said shock absorber means.

8. A leveling system as set forth in claim 7 which includes spring means disposed within said fluid chamber and connected to said valve member for biasing said member within the said bore in response to relative movement between said first housing means and said shock absorber means.

9. A leveling system as set forth in claim 7 which includes damping means for limiting movement of said valve member within said bore.

10. A leveling system as set forth in claim 1 which includes a source of pressurized actuating fluid communicable with said fluid chamber through said valve means.

11. In a leveling system for controlling the attitude between the sprung and unsprung portions of a vehicle,
a pair of suspension assemblies each including a suspension unit and an associated spring unit,
said suspension units comprising housing means defining a fluid chamber and having a first portion thereof secured to the unsprung portion of the vehicle and a second portion thereof secured to the sprung portion of the vehicle,
said spring units comprising housing means and flexible partition means dividing the interior thereof into first and second compartments,
said first compartments of said spring units being charged with a preselected volume of pressurized gas,
said second compartments of said spring units being communicable with the fluid chamber of the associated suspension unit and each of said second compartments and said fluid chambers containing a preselected quantity of actuating fluid, and
valve means for selectively communicating actuating fluid to and from said fluid chamber and means for actuating said valve means in response to differential movement between said housing means and said shock absorbing means, whereby
contraction of said fluid chambers upon relative movement of said first and second portions thereof will result in fluid being transmitted to said second compartments of said spring units to bias said partition means toward said first compartments against the resistance of the pressurized gas within said first compartments.

12. A leveling system as set forth in claim 11 which includes fluid conduit means communicating said fluid chambers of each of said suspension units, whereby contraction of one of said fluid chambers results in actuating fluid being transmitted to the fluid chamber of the other of said suspension units.

13. A leveling system as set forth in claim 12 wherein said suspension assemblies are mounted at the front and rear end of the vehicle along the same side thereof to reduce pitching movement of the sprung portion of the vehicle.

14. A leveling system as set forth in claim 12 wherein said suspension assemblies are mounted at one end of the vehicle adjacent the opposite sides thereof, whereby to reduce rolling movement of the sprung portion of the vehicle.

15. A leveling system as set forth in claim 12 which includes fluid conduit means communicating said second compartments of said spring units, whereby contraction of one of said fluid chambers results in actuating fluid being transmitted to said second compartment of the spring units of each of said suspension assemblies, whereby to reduce the spring rate of said assemblies.

16. A leveling system as set forth in claim 11 which includes a source of pressurized actuating fluid and means for communicating said source with said valve means, wherein said source of pressurized actuating fluid comprising a fluid reservoir and pump means for pumping actuating fluid between said reservoir and said valve means.

17. A leveling system as set forth in claim 11 which includes first and second pairs of suspension assemblies each comprising one of said suspension units and one of said spring units, said first and second pair of suspension assemblies being disposed at the front and rear ends of the vehicle along the opposite sides thereof, and which includes conduit means communicating the suspension assemblies along the same sides of the vehicle, whereby to reduce pitching movement of the sprung portion of the vehicle.

18. A leveling system as set forth in claim 17 which includes conduit means communicating the suspension assemblies at the front and rear ends of the vehicle, whereby to reduce rolling movement of the sprung portion of the vehicle.

19. In a leveling system for controlling the attitude between first and second portions of a vehicle,
a suspension assembly comprising,
shock absorber means having attachment means connectable to one of the vehicle portions,
housing means defining a fluid chamber and having a mounting portion thereof operatively connected to said shock absorber means and attachment means connectable to the other of the vehicle portions, whereby expansion and contraction of said chamber effects preselected separation between said mounting portion and said attachment means and thereby changes the attitude between said first and second vehicle portions,,
valve means for selectively communicating actuating fluid to and from said fluid chamber,
means for actuating said valve means in response to differential movement between said housing means and said shock absorbing means, and
spring means cooperable with said shock absorber means and actuable in response to actuating fluid being transmitted to and from said housing means.

20. A leveling system as set forth in claim 19 which includes a pair of suspension assemblies mounted at the front and rear end of the vehicle along the same side thereof to reduce pitching movement of one of said portions of the vehicle relative to the other portion thereof.

21. A leveling system as set forth in claim 20 which includes a pair of suspension assemblies mounted at one end of the vehicle adjacent the opposite sides thereof to reduce rolling movement of one of said portions of the vehicle relative to the other of said portions.

22. A leveling system as set forth in claim 20 which includes load compensator means communicable with the fluid chamber of each of said suspension units, said load compensator means comprising first and second fluid compartments and means for forcing fluid from one of said compartments in response to an increase in fluid pressure in the other of said compartments.

23. In a leveling system for controlling the attitude between the sprung and unsprung portions of a vehicle,
  a pair of suspension assemblies each including a suspension unit and an associated spring unit,
  said suspension units comprising housing means defining a fluid chamber and having a first portion thereof secured to the unsprung portion of the vehicle and a second portion thereof secured to the sprung portion of the vehicle,
  said spring units comprising housing means and flexible partition means dividing the interior thereof into first and second compartments,
  said first compartments of said spring units being charged with a preselected volume of pressurized gas,
  which includes load compensator means communicable with the fluid chamber of each of said suspension units, said load compensator means comprising first and second fluid compartments and means for forcing fluid from one of said compartments in response to an increase in fluid pressure in the other of said compartments,
  said load compensator means comprising flexible diaphragm means separating said first and second compartments thereof, whereby an increase in fluid pressure in the fluid chamber of one of said suspension units results in fluid being forced into one of said compartments of said load compensator means, resulting in said diaphragm means being biased toward the other of said compartments in said load compensator means to force fluid toward the fluid chamber of the other of said suspension units,
  said second compartments of said spring units being communicable with the fluid chamber of the associated suspension unit and each of said second compartments and said fluid chambers containing a preselected quantity of actuating fluid, whereby
  contraction of said fluid chambers upon relative movement of said first and second portions thereof will result in fluid being transmitted to said second compartments of said spring units to bias said partition means toward said first compartments against the resistance of the pressurized gas within said first compartments.

References Cited
UNITED STATES PATENTS

| | | | |
|---|---|---|---|
| 3,227,466 | 1/1966 | Garcea | 280—124 |
| 3,156,481 | 11/1964 | Dangauthier | 280—124 |
| 3,148,871 | 9/1964 | Wilkins | 280—124 |
| 3,088,726 | 5/1963 | Dangauthier | 280—124 |
| 3,049,360 | 8/1962 | Allinquant | 280—124 |
| 2,926,023 | 2/1960 | Kraus | 280—124 |
| 3,331,616 | 7/1967 | Jackson | 267—64 |

PHILIP GOODMAN, Primary Examiner

U.S. Cl. X.R.

280—124